(12) United States Patent
Sharpes

(10) Patent No.: US 11,140,940 B2
(45) Date of Patent: Oct. 12, 2021

(54) GENERATOR SPINNING IN A WEARABLE SYSTEM

(71) Applicant: The Government of the United States, as represented by the Secretary of the Army, Washington, DC (US)

(72) Inventor: Nathan Sharpes, Abingdon, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 203 days.

(21) Appl. No.: 16/550,335

(22) Filed: Aug. 26, 2019

(65) Prior Publication Data

US 2020/0068986 A1   Mar. 5, 2020

Related U.S. Application Data

(60) Provisional application No. 62/724,824, filed on Aug. 30, 2018.

(51) Int. Cl.
| | |
|---|---|
| A43B 3/00 | (2006.01) |
| H02K 7/116 | (2006.01) |
| H02J 7/00 | (2006.01) |
| A43B 21/24 | (2006.01) |
| H02J 7/32 | (2006.01) |
| H02K 7/18 | (2006.01) |
| A43B 21/30 | (2006.01) |
| F16D 41/00 | (2006.01) |

(Continued)

(52) U.S. Cl.
CPC ............ *A43B 3/0015* (2013.01); *A41D 1/002* (2013.01); *A43B 21/24* (2013.01); *A43B 21/30* (2013.01); *F16D 41/00* (2013.01); *F16D 67/02* (2013.01); *F16H 3/44* (2013.01); *F16H 57/10* (2013.01); *H02J 7/32* (2013.01); *H02K 7/112* (2013.01); *H02K 7/116* (2013.01); *H02K 7/1853* (2013.01); *F16H 2200/0034* (2013.01); *F16H 2200/20* (2013.01); *F16H 2200/2005* (2013.01); *H02J 7/00032* (2020.01)

(58) Field of Classification Search
CPC ... F16H 3/44; F16H 3/54; F16H 33/02; F16H 57/10; F16H 2200/20; F16H 2200/0034; F16H 2200/2005; F16H 2200/2035; F16H 2200/2066; F16H 2200/2082; A43B 3/0015; A43B 3/0031; A43B 21/24; A43B 21/30; H02K 7/112; H02K 7/116; H02K 7/1853; B60T 1/04; B60T 1/14; F16D 41/00; F16D 49/00; F16D 67/02; A41D 1/002; H02J 7/32; H02J 7/00032; H02J 7/1407; H02J 7/143
USPC ....................... 290/1 C, 1 R; 320/107; 36/27
See application file for complete search history.

(56) References Cited

U.S. PATENT DOCUMENTS

| | | | | |
|---|---|---|---|---|
| 1,506,282 | A | * | 8/1924 | Barbieri .................. A43B 7/04 310/75 B |
| 3,378,756 | A | * | 4/1968 | Potter ....................... H02P 9/42 322/32 |

(Continued)

*Primary Examiner* — Pedro J Cuevas
(74) *Attorney, Agent, or Firm* — Ronald Krosky

(57) ABSTRACT

A wearable system, such as a footwear system, can employ a generator. The generator can be an electro-mechanical generator with a portion that spins to create an electricity. The portion that spins can be spun in such a manner that it does not stop, but instead a next spin beings before a previous spin completes. This can repeat until the generator reaches a terminal velocity.

20 Claims, 10 Drawing Sheets

(51) Int. Cl.
*F16D 67/02* (2006.01)
*H02K 7/112* (2006.01)
*A41D 1/00* (2018.01)
*F16H 3/44* (2006.01)
*F16H 57/10* (2006.01)

(56) References Cited

U.S. PATENT DOCUMENTS

| | | | | |
|---|---|---|---|---|
| 3,534,391 A * | 10/1970 | Bauer | | A43B 7/04 219/211 |
| 3,732,949 A * | 5/1973 | Williams | | F03G 1/00 185/40 R |
| 3,800,212 A * | 3/1974 | Branco | | H02K 7/1853 322/28 |
| 4,228,360 A * | 10/1980 | Navarro | | F03B 13/1885 290/43 |
| 4,287,428 A * | 9/1981 | Smith | | H02J 7/14 185/11 |
| 4,418,286 A * | 11/1983 | Scott | | F03B 13/1845 290/42 |
| 4,610,140 A * | 9/1986 | Thompson, Jr. | | F03B 13/1815 60/506 |
| 4,612,768 A * | 9/1986 | Thompson, Jr. | | F03B 13/1815 60/506 |
| 4,674,199 A * | 6/1987 | Lakic | | A43B 1/0054 219/211 |
| 4,782,602 A * | 11/1988 | Lakic | | A41D 19/001 219/211 |
| 4,845,338 A * | 7/1989 | Lakic | | A41D 19/001 219/211 |
| 5,495,682 A * | 3/1996 | Chen | | A43B 3/0015 36/2.6 |
| 5,929,531 A * | 7/1999 | Lagno | | F03B 13/262 290/53 |
| 6,255,799 B1 * | 7/2001 | Le | | A43B 3/00 219/211 |
| 6,281,594 B1 * | 8/2001 | Sarich | | A43B 3/00 290/1 A |
| 6,291,900 B1 * | 9/2001 | Tiemann | | H02P 9/04 290/1 A |
| 6,744,145 B2 * | 6/2004 | Chang | | A43B 3/0005 219/211 |
| 6,825,574 B1 * | 11/2004 | Mooring | | F03D 1/00 290/1 R |
| 7,834,471 B2 * | 11/2010 | Cripps | | F03G 6/001 290/1 E |
| 7,956,753 B2 * | 6/2011 | Fogg | | G08B 29/181 340/573.1 |
| 8,013,463 B2 * | 9/2011 | Preston | | F03G 7/00 290/54 |
| 8,148,832 B2 * | 4/2012 | Cripps | | H02P 9/04 290/1 E |
| 8,970,054 B2 * | 3/2015 | Stanton | | F03G 5/06 290/1 C |
| 9,107,468 B1 * | 8/2015 | Xiong | | A43B 7/005 |
| 9,190,886 B2 * | 11/2015 | Stanton | | H02K 7/1861 |
| 9,498,017 B2 * | 11/2016 | Lin | | A43B 3/0015 |
| 9,590,474 B2 * | 3/2017 | Rastegar | | H02K 7/1853 |
| 9,716,419 B2 * | 7/2017 | Stanton | | F03G 5/06 |
| 10,003,240 B2 * | 6/2018 | Rastegar | | H02K 7/1853 |
| 10,071,201 B2 * | 9/2018 | Su | | A61F 7/00 |
| 10,499,703 B2 * | 12/2019 | Sharpes | | H02K 7/1853 |
| 10,641,367 B2 * | 5/2020 | Sharpes | | F16H 35/02 |
| 10,743,611 B2 * | 8/2020 | Rennex | | A43B 13/145 |
| 2006/0213082 A1 * | 9/2006 | Meschan | | A43B 13/181 36/27 |
| 2009/0152867 A1 * | 6/2009 | Cripps | | F03G 1/02 290/42 |
| 2013/0020986 A1 * | 1/2013 | Linzon | | A43B 3/0015 320/107 |
| 2013/0219743 A1 * | 8/2013 | Ye | | A43B 7/146 36/2.6 |
| 2015/0097374 A1 * | 4/2015 | Lin | | F03G 5/06 290/1 R |
| 2015/0162803 A1 * | 6/2015 | Stanton | | A43B 3/0015 290/1 C |
| 2016/0020671 A1 * | 1/2016 | Rastegar | | H02K 7/1853 290/1 E |
| 2016/0100651 A1 * | 4/2016 | Rastegar | | A43B 7/04 36/2.6 |
| 2017/0043488 A1 * | 2/2017 | Henry | | B26B 3/00 |
| 2018/0220738 A1 * | 8/2018 | Rennex | | A43B 13/184 |
| 2019/0159543 A1 * | 5/2019 | Sharpes | | H02K 7/1853 |
| 2019/0162277 A1 * | 5/2019 | Sharpes | | A43B 3/0005 |
| 2020/0068985 A1 * | 3/2020 | Sharpes | | F16H 33/02 |
| 2020/0072319 A1 * | 3/2020 | Sharpes | | A43B 21/30 |
| 2020/0378462 A1 * | 12/2020 | Rennex | | A43B 13/181 |

* cited by examiner

US 11,140,940 B2

GENERATOR SPINNING IN A WEARABLE SYSTEM

CROSS-REFERENCE

This application claims priority to U.S. Provisional Application No. 62/724,824 filed on Aug. 30, 2018. U.S. Provisional Application No. 62/724,824 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Batteries can be used to store energy. In one example, a cellular telephone or radio can be powered by batteries. Without being physically tethered to a wall outlet, this gives the user a great amount of physical freedom when using the cellular telephone or radio.

However, batteries have a finite storage capacity. The cellular telephone or radio can drain a battery until the battery is drained. Therefore, the cellular telephone or radio can have a limited amount of usage until the battery is replaced or recharged.

SUMMARY

In one embodiment, a method can be performed by a footwear system. The method can comprise causing a generator that is part of the footwear system to being a first spin at a first time as well as causing the generator that is part of the footwear system to begin a second spin at a second time. The second time can be after the first time, the first spin can comprise a spin-up followed by a spin-down, and the second spin can begin during the spin-down.

In another embodiment, a footwear system can comprise a generator and a hardware transfer component configured to transfer a first energy at a first time to the generator and transfer a second energy at a second time to the generator. The generator can be configured to produce a first spin in response to reception of the first energy and can be configured to produce a second spin in response to reception of the second energy. The second time can be after the first time and the production of the second spin can occur before completion of the first spin.

In yet another embodiment, a method can be performed by a wearable system. The method can comprise causing a generator that is part of the wearable system to engage in a first spin sequence over a first time span with a first power output range and can comprise causing the generator that is part of the wearable system to begin a second spin sequence over a second time span with a second power output range. The second time span and the first time span can be separate and distinct from one another, with the second time span following the first time span. A low value of the first power output range can be lower than a low value of the second power output range. Additionally, a high value of the first power output range can be lower than a high value of the second power output range.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

Figure 1:
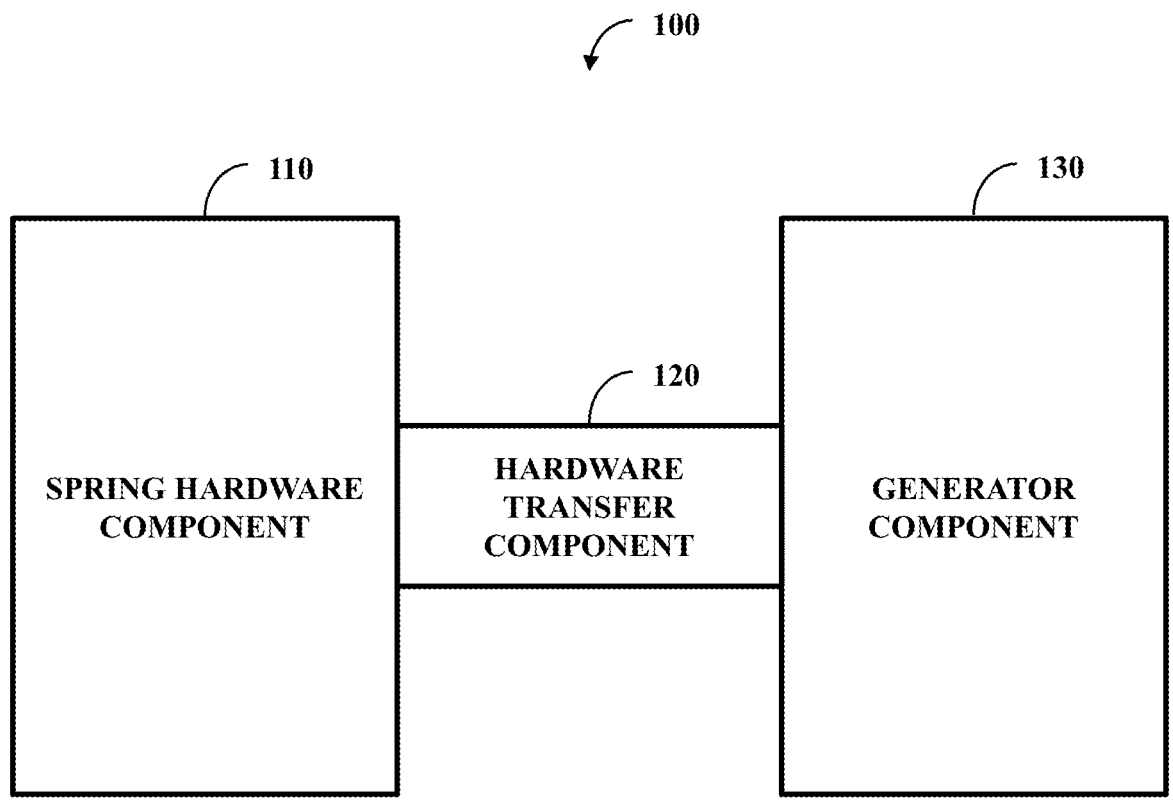
FIG. 1 illustrates one embodiment of a wearable system.

A phase can be referred to in shorthand with regard to a Figure. For example, the phase 'b' of FIG. 2 can be referred to as FIG. 2b.

DETAILED DESCRIPTION

A person can wear hardware that converts physical motion into electrical energy. The electrical energy can recharge a battery, such as a battery of a personal electronic device (e.g., a cellular telephone or radio). In one embodiment, leg motion from walking or running can be leveraged to produce battery charging energy.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a wearable system 100, such as a footwear system, comprising a spring hardware component 110, a hardware transfer component 120, and a generator component 430. The spring hardware component 110 can comprise a spring that captures energy. An example of this capture when the wearable system 100 is a footwear system can be that the spring is compressed during a heel strike and then the spring releases the energy by decompression during a heel lift. The hardware transfer component 120 can transfer the released energy to the generator component 130 that comprises a generator. The generator can take this transferred energy and produce an electricity.

As an example of electricity production, the hardware transfer component 120 can be a drivetrain that spins in response to the spring releasing the energy. The drivetrain can be physically coupled to a part of the generator such that when the drivetrain spins, the part of the generator spins. When the part of the generator spins, the generator can produce an electricity.

During an example normal operation, a person can walk or run making a series of heel strikes and heel lifts. In view of this multiple spring compressions/decompressions can occur and multiple spins of the part of the generator. There can be a benefit to start a second spin before a first spin ends in view of various physical phenomenon, such as that it is easier to keep a generator in motion than to start the motion.

An example spin can have a spin-up phase (where the revolutions per minute increase) and a spin-down phase (where the revolutions per minute decrease). Consider an example of a first spin and a second spin. The first spin can result from the hardware transfer component 120 transferring a first energy at a first time to the generator. Similarly, the second spin can result from the hardware transfer component 120 and transfer a second energy at a second time, after the first time, to the generator. The generator can produce a first spin in response to reception of the first energy and produce a second spin in response to reception of the second energy. The second spin of the generator can occur before completion of the first spin, such as during a spin-down phase of the first spin.

The generator component 130 can comprise a charge transfer component configured to transfer a first charge resulting from the first spin and a second charge resulting from the second spin to a battery from the generator. These charges can be continuous and at least partially concurrent. Additionally, the battery can be for a personal electronic device of a wearer of the system 100, such as a smartwatch wearable on a wrist.

In energy conversion devices, such as the system 100, the rate at which energy is converted from one form to another, or power, can be the primary attribute of a system. The power output from such a system can be in direct proportion to the power available from a source. There can be an effect on the source resulting from this energy conversion, called damping. Damping is a non-restorative force, meaning energy is leaving the source system and is not returned. Damping can also be rate proportional, meaning the greater the rate of energy conversion, the greater the resistance to motion. Damping effects on the body result in the body having to perform more work, increasing metabolic expenditure and fatigue.

There is consequently a time penalty associated with energy conversion. The faster energy is converted, the more power is demanded from the source, tending to slow it down or desire increased output to keep up with demand. In the context of harvesting energy from human motion, damping is a highly undesirable trait. By its nature, interacting with a damper (a source of damping) causes undue forces on the body which oppose and do not aid (e.g., are non-restorative) the body's motion.

An example of a damper is an electromagnetic generator, which converts mechanical energy into electrical energy. The faster the generator is made to spin, the more mechanical force is required (counter-torque), and the quicker the motion, the more pronounced the effect (e.g., it is velocity proportional). The tradeoff is inherent between performance and comfort, as comfort operates on slower time scales while performance is achieved on faster time scales. Coupling an electromagnetic generator to the body to harvest energy is an attempted union of disagreeable timing.

Figure 2:
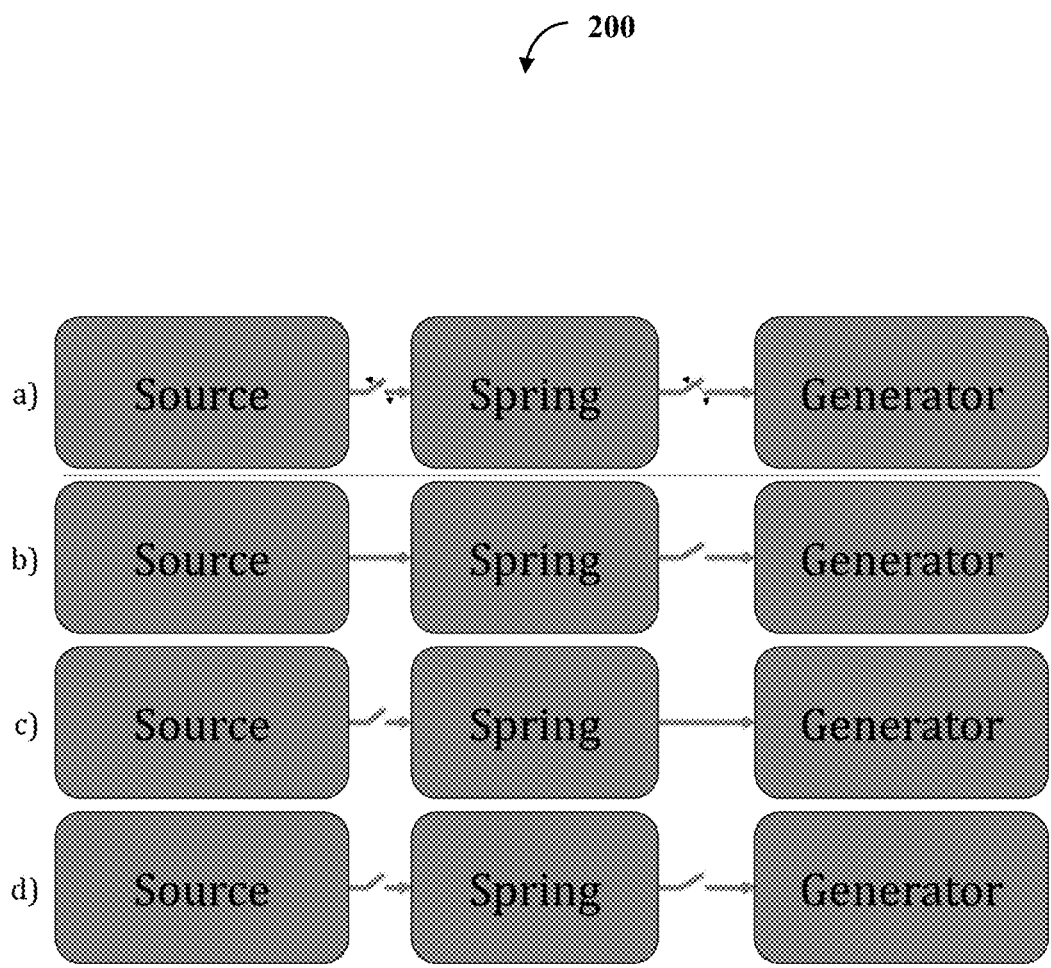
FIG. 2 illustrates an arrangement of block diagrams.

FIG. 2 illustrates an arrangement of block diagrams 200, with phases 'a' to 'd.' In phase 'a,' there is a source of mechanical energy (such as a human ankle), a mechanical storage device (such as a spring), and an energy conversion mechanism (such as a generator). Connection between source and spring as well as the spring and generator can be controlled by a controller component. Phase 'b' can be during the heel strike. Energy from the source can stored in the spring while the generator is decoupled. Phase 'c' allows for energy stored in the spring is used to turn the generator and the source can be decoupled (e.g., a brace used by the ankle can be decoupled). Phase 'd', which along with phase 'c' can be part of the heel left, can allow the generator to turn under its own inertia while the source is reset (e.g., return stoke of a reciprocating motion or swing phase of gait).

A source imparts mechanical energy into a spring, where it is stored. That stored energy is later released, driving a generator where the mechanical energy is converted to electrical energy. As is shown in the block diagram of FIG. 21a, the interconnects between the source and spring, and spring and generator can be open and closed independently. In the initial state (FIG. 2b), the source is connected to the spring and transfers energy to be stored. The spring is not connected to the generator at this time. The source then disconnects from the spring (FIG. 2c) and is allowed to reset or return it its initial position. At this time the spring connects to the generator, driving it, and converting the stored mechanical energy into electricity. When the spring has released the stored energy, it is disconnected from the generator (FIG. 2d) and the generator 'freewheels' or continues to rotate under its own inertia. At this time, the source is still disconnected from the spring. When the source is ready to begin the next cycle, it again connects to the spring (FIG. 2b) and the cycle repeats.

The spring can capture the first energy during a first heel strike and the second energy during a second heel strike. These energies can be transferred by the hardware transfer component 120 of FIG. 1 (e.g., a series of gears) from the spring hardware component 110 of FIG. 1 to the generator component 130 of FIG. 1 when the spring releases the energy.

The spring hardware component 110 of FIG. 1 can comprise a first coupling hardware and a second coupling hardware. The first coupling hardware component can be configured to cause the spring to couple or decouple to a source of the first energy and the second energy and the second coupling hardware component can be configured to cause the generator to couple or decouple to the spring (e.g., coupling between the spring hardware component 110 of FIG. 1 and the hardware transfer component 120 of FIG. 1 or between the hardware transfer component 120 of Figure land the generator component 130 of FIG. 1). During first phase (e.g., phase 'b') the first coupling hardware component can cause the spring to couple with the source while the second coupling hardware component can cause the generator to decouple with the spring. During a second phase (e.g., phase 'c') the first coupling hardware component can cause the spring to decouple with the source while the second coupling hardware component can cause the generator to couple with the spring. The first phase and the second phase can be separate and distinct, with the second phase following the first phase. Depending on the spring type used, different functions can occur during the first and second phases.

The spring can be a rotational spring, such as a torsion spring or a power spring. The drivetrain can be coupled to an arbor or housing of the rotational spring. The spring can be wound-up to store energy and then unwound to release the energy. When unwinding is complete, the spring can be ready for another wind-up.

The spring can be a linear spring, such as a compression spring or a tension spring. As an example with a compression spring, the spring can be loaded from a first end with a brake keeping a second end, the opposite end, in place. Once loaded, the brake can cause release in the opposite direction such that the second end moves with a one-way clutch preventing movement from the first end. This causes the spring to physically shift. Before more energy capture can occur, the spring should be returned to its original location.

A reset component, that can be part of the spring hardware component 110, can cause the spring to be subject to a reset during a third phase (e.g., phase 'd'). The third phase can be separate and distinct from both the first and second phases and follow the second phase. During the third phase the first coupling hardware component can cause the spring to decouple with the source while the second coupling hardware component can causes the generator to decouple with the spring.

Figure 3:
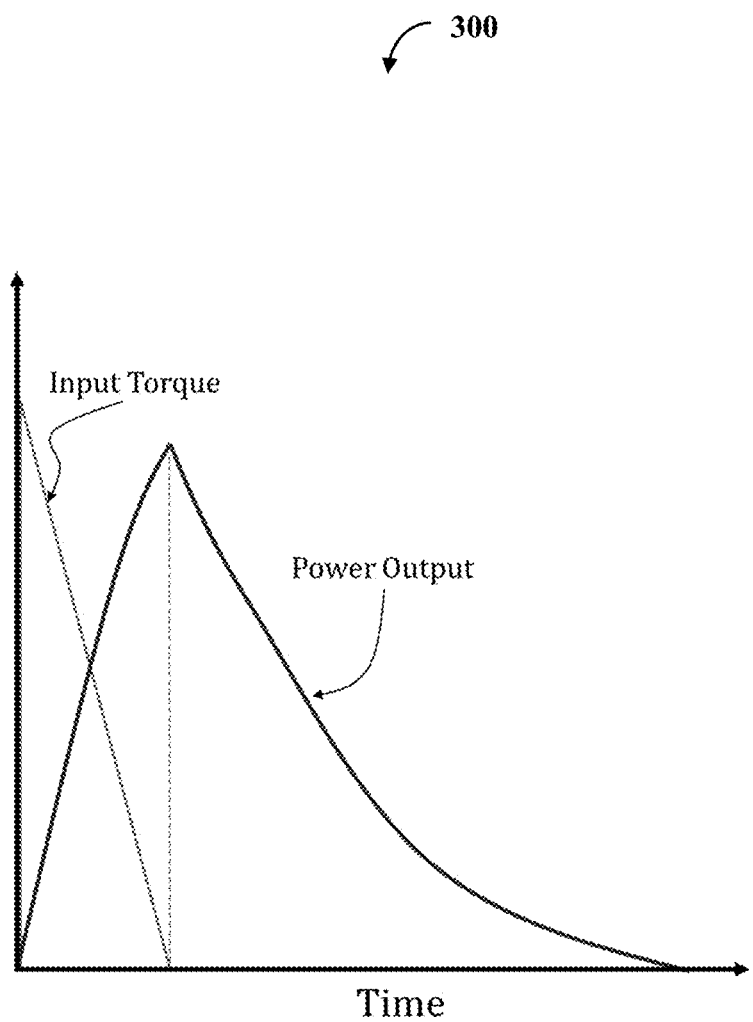
FIG. 3 illustrates one embodiment of a graph.

FIG. 3 illustrates one embodiment of a graph 300 that gives a qualitative representation of the part of the cycle, shown in phase 'c' of FIG. 2, where the spring is transferring energy to the generator and subsequently electrical power is output. If the spring is linear, peak torque can happen initially and decays linearly back to zero. While torque is applied, the generator accelerates in response. Since the power output of an electromagnetic generator is linearly proportional to rotation speed (angular velocity), power output increases as the generator accelerates. However, damping or counter-torque also rises proportionally to rotation speed, caused by the level of energy conversion, and thus rotation speed and subsequently power output tend to taper off as speed increases and spring force diminishes. When input torque is exhausted, the driving force is absent though the counter-torque damping remains. Because of this, generator rotational speed and power output decay over time until the generator stops rotating.

The graph 300 can be for a decoupled energy harvest from human motion. In one embodiment of a power generator, an electromagnetic alternator is driven at a constant rotational velocity by a source of rotation (e.g. motor, turbine, etc.). However, in the case of energy harvesting, many sources of mechanical forces/torques provide intermittent and non-constant inputs. For cyclic-type motions, there is a period of positive work done to the output, followed by periods of no work done to the output while the system resets or returns to an initial position, as in a reciprocating motion. The work done is then resembles an impulse.

Figure 4:
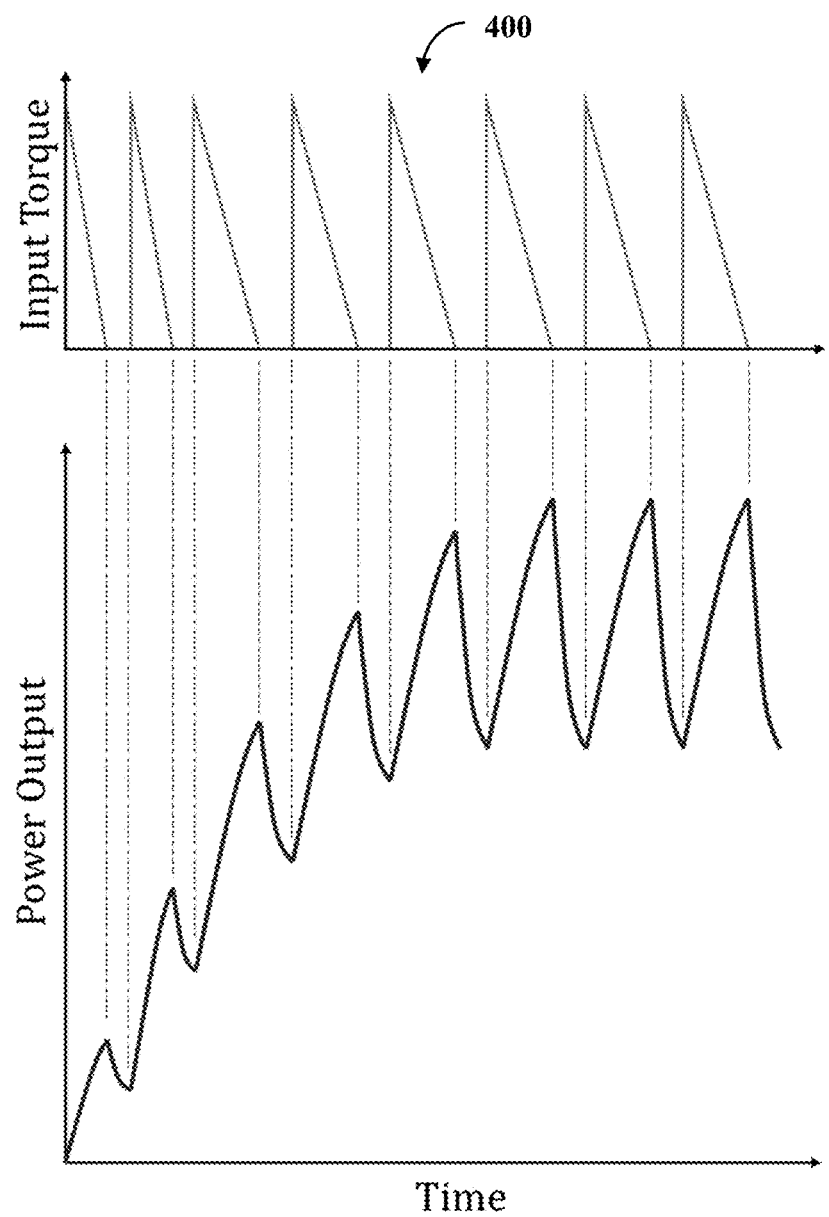
FIG. 4 illustrates one embodiment of a graph with two portions.

FIG. 4 illustrates a graph 400 with two portions—input torque over time and power output over time. If, however, the cycle described in FIG. 3 repeats quickly enough, it can be the case where the generator receives the next torque impulse before the generator has come to rest (e.g., start the second spin before the end of the first spin). In this case, some of the generator's inertia has already been overcome by the previous cycle, and the generator can then be made to spin faster than in the previous cycle. If this sequence continues, the generator speed and subsequent power output can, over time, build up to a terminal velocity, a rotational speed limited by counter-torque, generator inertia, and spring torque. With this strategy, a higher power and more constant output can be achieved than turning the generator directly with a high gear ratio.

Returning to the graph 300 of FIG. 3, the generator (power output) spins up in response to spring decompressing (input torque). However, without anything else, the power output returns to zero and everything starts anew. The problem with this is it take more energy to start something from a standstill than something in motion. As illustrated with the graph 400, timing occurs so that standstill does not occur. This can continue until the generator cannot spin further since the generator is a source of damping.

So the second spin can produce a higher level of power (e.g., electricity) than the first spin as can be seen in the graph 400 (e.g., first spin being furthest left peak and the second spin being the second furthest left peak). The hardware transfer component 120 of FIG. 1 can to transfer a third energy at a third time to the generator and the generator can produce a third spin in response to reception of the third energy. The third spin can be the third furthest left peak, such that the third time is after the second time and production of the third spin can occurs before completion of the second spin. When the second spin starts, the first spin is can be at a first revolution count and similarly when the third spin starts, the second spin can be at a second revolution count that is greater than the first revolution count.

Figure 5:
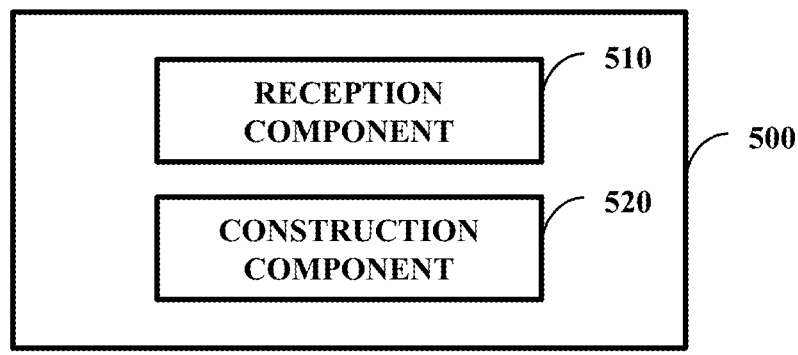
FIG. 5 illustrates one embodiment of a system comprising a reception component and a construction component.

FIG. 5 illustrates one embodiment of a system 500 comprising a reception component 510 and a construction component 520. The reception component 510 can receive design plans for wearable element, such as a footwear element (e.g., a boot or hardware for attachment upon a boot, such as an insole impending the system 100 of FIG. 1). The construction component 520 can manage construction of the footwear element in view of the design plans (e.g., operate a manufacturing device).

In one embodiment, the reception component 510 receives an instruction to design an energy harvester. The construction component 520 constructs design plans such that for a wearer the features of FIG. 4 are achieved during normal walking (e.g., by way of Monte Carlo analysis). Different configurations can be available if a wearer is walking, running, etc. Also, a designed system can be customizable based on heel strike power, weight, gait, stride length, etc. of an anticipated user.

Figure 6:
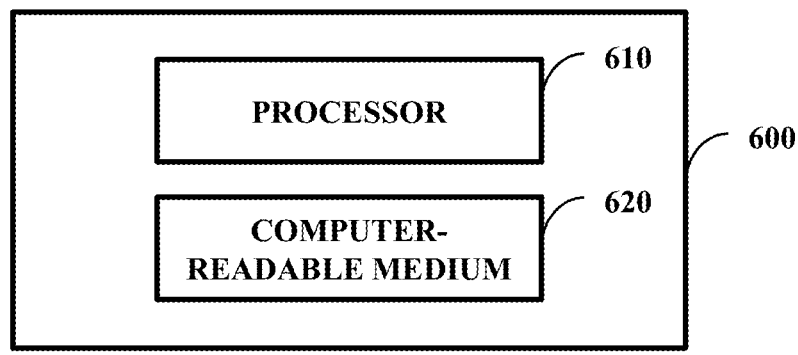
FIG. 6 illustrates one embodiment of a system comprising a processor and a computer-readable medium.

FIG. 6 illustrates one embodiment of a system 600 comprising a processor 610 and a computer-readable medium 620 (e.g., non-transitory computer-readable medium). In one embodiment, the computer-readable medium 620 is communicatively coupled to the processor 610 and stores a command set executable by the processor 610 to facilitate operation of at least one component disclosed (e.g., the reception component 510 of FIG. 5). In one embodiment, at least one component disclosed herein (e.g., the construction component 520 of FIG. 5) can be implemented, at least in part, by way of non-software, such as implemented as hardware by way of the system 600. In one embodiment, the computer-readable medium 620 is configured to store processor-executable instructions that when executed by the processor 610, cause the processor 610 to perform at least part of a method disclosed herein (e.g., at least part of the method 700-1000 discussed below).

Figure 7:
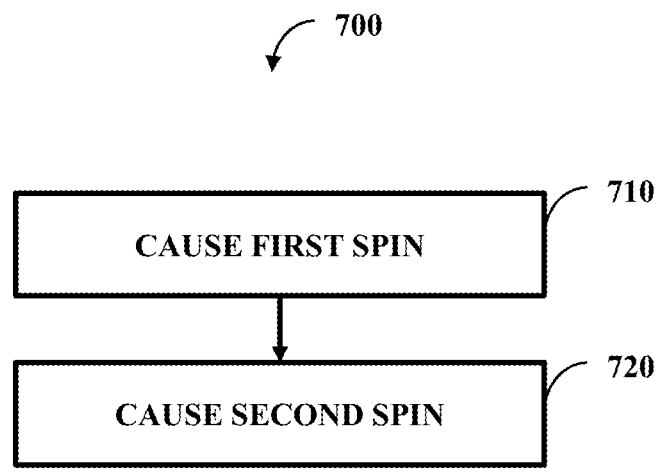
FIG. 7 illustrates one embodiment of a method comprising two actions.

FIG. 7 illustrates one embodiment of a method 700 comprising two actions 710-720. At 710, causing the generator, such as when part of the footwear system, to being the first spin at the first time can occur, such as in response to released spring energy. At 720, causing the generator to begin the second spin at the second time that is after the first time, such as in response to released spring energy. The first spin can comprise a spin-up followed by a spin-down, with the second spin beginning during the spin-down.

To achieve the spins, aspects in accordance with FIG. 2 can be practiced. In one example, as part of 710, there can be engaging the spring with the generator prior to causing the generator to be caused to being the first spin and disengaging the spring with the generator after the energy is released from the spring. Also part of 710 can be engaging the spring with the source configured to impart the spring with energy (e.g., energy being released is the energy imparted upon the spring) and disengaging the spring from the source after the spring is imparted with energy. Various configurations can occur such as the source and the spring being engaged while the spring and generator are disengaged, the generator and the spring being engaged while the spring and source are disengaged, as well as the source and the spring being disengaged when the spring and the generator are disengaged.

Figure 8:
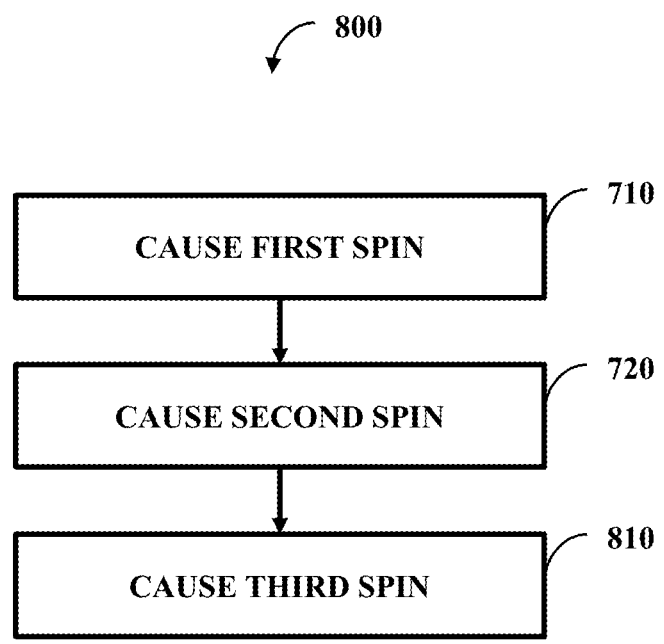
FIG. 8 illustrates one embodiment of a method comprising three actions.

FIG. 8 illustrates one embodiment of a method 800 comprising three actions 710-720 and 810. The causation of the first and second spins can occur at 710 and 720, respectively, and at 810 there can be causing the generator to begin the third spin at the third time that is after the second time. Like the first spin, the second spin can have a spin-up and spin-down, with the third spin beginning during the second spin-down. The rotational speed during the second spin when the third spin begins can be faster than a rotational speed during the first spin with the second spin beings. This can lead to implementation in accordance with the graph 400 of FIG. 4.

Figure 9:
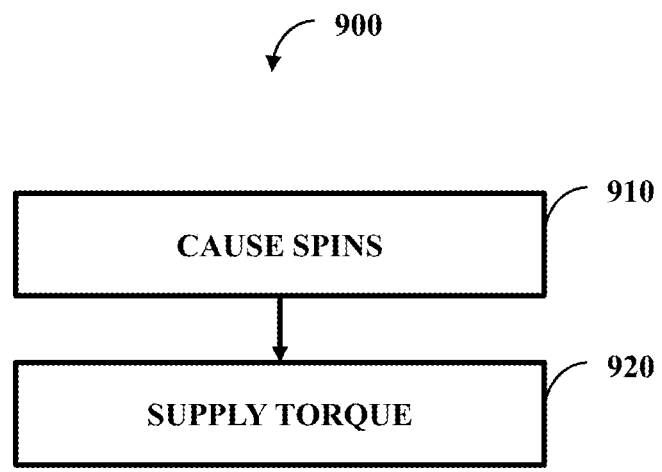
FIG. 9 illustrates one embodiment of a method comprising two actions.

FIG. 9 illustrates one embodiment of a method 900 comprising two actions 910-920. At 910, there can be causing the generator to engage in a first spin sequence over a first time span with a first power output range (e.g., practiced at 710 of FIG. 7) and causing the generator to begin a second spin sequence over a second time span with a second power output range (e.g., practiced at 720 of FIG. 7); the second time span and the first time span are separate and distinct from one another, with the second time span following the first time span.

Additionally, a low value of the first power output range can be lower than a low value of the second power output range. Similarly, a high value of the first power output range can be lower than a high value of the second power output range. This can lead to a result consistent with the graph 400 of FIG. 4 where the peak of the next spin is higher than a peak of the previous spin and the valley of the next spin is higher than the valley of the previous spin.

This concept can continue. In one example, at 910, there can be causing the generator to begin a third spin sequence over a third time span with a third power output range (e.g., practiced at 810 of FIG. 8); the third time span can be separate and distinct from the first and second time spans, with the third time span following the second time span. A low value of the third power output range can be about equal to the low value of the second power output range. In addition, a high value of the third power output range can be about equal to the high value of the second power output range. This can be an example of the terminal velocity being reached that is discussed with regard to the graph 400 of FIG. 4.

At 920, there can be supplying input torques to the generator to begin spin sequences—a first input torque for the first spin sequence, a second input torque for the second spin sequence, and a third input torque for the third spin sequence. These input torques can be about equal, such as being supplied for the same walking sequence and therefore the same stepdown motion occurring repeatedly. As an example, the input torques can be supplied by the spring (e.g., a compression spring) due to heel strikes, such as three strikes in series for three spins followed by three heel lifts.

In one embodiment, the spring is a tension spring. The tension spring can be coupled to the source and decoupled from the generator for at least part of the heel strike. The tension spring can be decoupled from the source and coupled to the generator for at least part of the heel lifts. So the three spins produced from the three heel strikes/lifts can result in production of three energies—a first energy from the first spin sequence, a second energy from the second spin sequence, and a third energy from the third spin sequence. The personal electronic device of a wearer of the wearable system can have its battery charged by these three energies.

Figure 10:
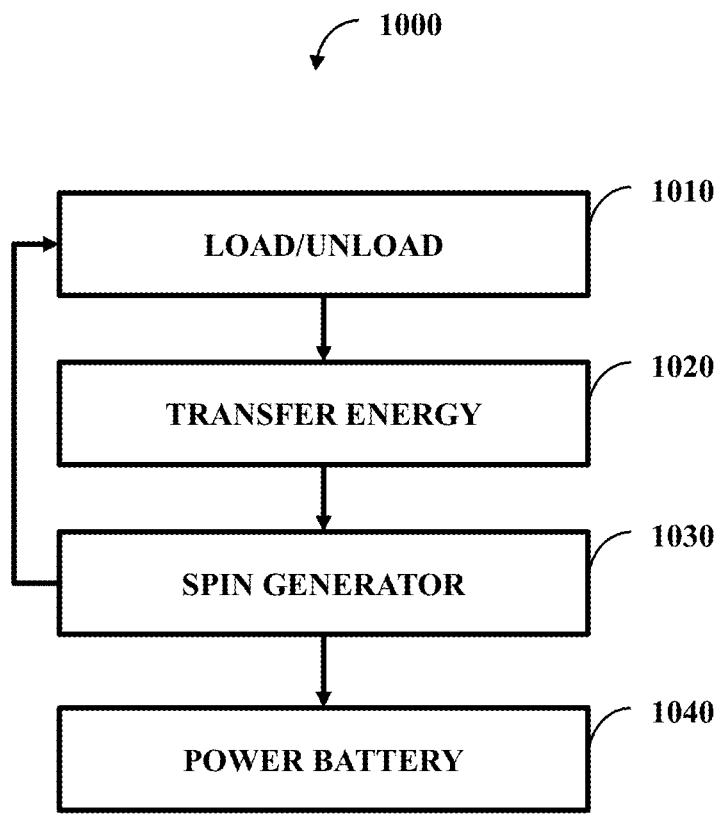
FIG. 10 illustrates one embodiment of a method comprising four actions.

FIG. 10 illustrates one embodiment of a method 1000 comprising four actions 1010-1040. At 1010, the spring can experience loading and unloading due to human movement, such as from a heel strike/lift, knee movement, ankle movement, etc. In the case of a compression spring, this can be compression and release. In the case of a tension spring, this can be strain and release. In the case of a rotational spring, this can be winding and unwinding.

At 1020, energy can be transferred. This can be done, for example, by way of a drivetrain or gear set. With the gear set example, the spring releasing energy can cause a first gear to turn. The first gear can be coupled to another gear of a different ratio that turns. Ultimately the gear set can couple to the generator.

At 1030, the generator can spin. This spinning can be in response to received energy from the gear set. The method 1000 can both return to action 1010 for another human movement causing spring loading and uploading as well as continue on to action 1040.

At 1040, the battery can be powered by electricity produced from the generator spinning ultimately derived from the human movement. This battery can be powered wirelessly (by way of wireless charging techniques) as well as in a wired manner. This battery powering can be for a personal electronic device or other device.

While the methods disclosed herein are shown and described as a series of blocks, it is to be appreciated by one of ordinary skill in the art that the methods are not restricted by the order of the blocks, as some blocks can take place in different orders. As an example, with the method 900 of FIG. 9, the supplying of torque at 920 can occur before spins are caused at 910. Similarly, a block can operate concurrently with at least one other block.

What is claimed is:

1. A method, performed by a footwear system, the method comprising:
    causing a generator that is part of the footwear system to being a first spin at a first time; and
    causing the generator that is part of the footwear system to begin a second spin at a second time,
    where the second time is after the first time,
    where the first spin comprises a spin-up followed by a spin-down, and
    where the second spin begins during the spin-down.

2. The method of claim 1,
    where the generator is caused to begin the first spin in response to released energy from a spring of the footwear system and
    where the generator is caused to begin the second spin in response to released energy from the spring of the footwear system.

3. The method of claim 2, comprising:
    engaging the spring with the generator prior to causing the generator to be caused to being the first spin; and
    disengaging the spring with the generator after the energy is released from the spring.

4. The method of claim 3, comprising:
    engaging the spring with a source configured to impart the spring with an energy, the energy being released is the energy imparted upon the spring; and
    disengaging the spring from the source after the spring is imparted with the energy.

5. The method of claim 4,
    where the source and the spring are engaged while the spring and generator are disengaged and
    where the generator and the spring are engaged while the spring and source are disengaged.

6. The method of claim 4,
    where the source and the spring are disengaged when the spring and the generator are disengaged.

7. The method of claim 1, comprising:
    causing the generator that is part of the footwear system to begin a third spin at a third time,
    where the third time is after the second time,
    where the spin-up is a first spin spin-up,
    where the spin-down is a first spin spin-down,
    where the second spin comprises a second spin spin-up followed by a second spin spin-down,
    where the third spin begins during the second spin spin-down,
    where there is a first rotational speed of the generator at an end of the first spin spin-down and a start of the second spin,
    where there is a second rotational speed of the generator at an end of the second spin spin-down and a start of the third spin, and
    where the second rotational speed is faster than the first rotational speed.

8. A footwear system comprising:
    a generator;
    a hardware transfer component configured to transfer a first energy at a first time to the generator and transfer a second energy at a second time to the generator; and
    a spring configured to capture the first energy transferred by the hardware transfer component and capture the second energy transferred by the hardware transfer component,
    where the generator is configured to produce a first spin in response to reception of the first energy,
    where the generator is configured to produce a second spin in response to reception of the second energy,
    where the second time is after the first time, and
    where the production of the second spin occurs before completion of the first spin.

9. The footwear system of claim 8, comprising:
    a first coupling hardware component configured to cause the spring to couple or decouple to a source of the first energy and the second energy; and
    a second coupling hardware component configured to cause the generator to couple or decouple to the spring,
    where during a first phase the first coupling hardware component causes the spring to couple with the source while the second coupling hardware component causes the generator to decouple with the spring,
    where during a second phase the first coupling hardware component causes the spring to decouple with the source while the second coupling hardware component causes the generator to couple with the spring,
    where the first phase and the second phase are separate and distinct, and
    where the second phase follows the first phase.

10. The footwear system of claim 9, comprising:
    a reset component configured to cause the spring to be subject to a reset during a third phase,
    where the spring is a linear spring,
    where during the third phase the first coupling hardware component causes the spring to decouple with the source while the second coupling hardware component causes the generator to decouple with the spring,
    where the first phase and the third phase are separate and distinct,
    where the second phase and the third phase are separate and distinct, and
    where the third phase follows the second phase.

11. The footwear system of claim 8,
    where the hardware transfer component is configured to transfer a third energy at a third time to the generator,
    where the generator is configured to produce a third spin in response to reception of the third energy,
    where the third time is after the second time,
    where production of the third spin occurs before completion of the second spin,
    where when the second spin starts, the first spin is at a first revolution count,
    where when the third spin starts, the second spin is at a second revolution count, and
    where the second revolution count is greater than the first revolution count.

12. The footwear system of claim 11,
    where the hardware transfer component is configured to transfer a fourth energy at a fourth time to the generator,
    where the generator is configured to produce a fourth spin in response to reception of the fourth energy,
    where the fourth time is after the third time,
    where production of the fourth spin occurs before completion of the third spin,
    where when the fourth spin starts, the third spin is at a third revolution count, and where the second revolution count and the third revolution count are about equal.

13. The footwear system of claim 8, comprising:
a charge transfer component configured to transfer a first charge and a second charge to a battery from the generator,
where the first charge is a result of the first spin and
where the second charge is a result of the second spin.

14. A method, performed by a wearable system, the method comprising:
causing a generator that is part of the wearable system to engage in a first spin sequence over a first time span with a first power output range; and
causing the generator that is part of the wearable system to begin a second spin sequence over a second time span with a second power output range,
where the second time span and the first time span are separate and distinct from one another,
where the second time span follows the first time span,
where a low value of the first power output range is lower than a low value of the second power output range, and
where a high value of the first power output range is lower than a high value of the second power output range.

15. The method of claim 14, comprising:
causing the generator that is part of the wearable system to begin a third spin sequence over a third time span with a third power output range,
where the first time span and the third time span are separate and distinct from one another,
where the second time span and the third time span are separate and distinct from one another,
where the third time span follows the second time span,
where a low value of the third power output range is about equal to the low value of the second power output range, and
where a high value of the third power output range is about equal to the high value of the second power output range.

16. The method of claim 15, comprising:
supplying a first input torque to the generator that is employed to cause the generator to begin the first spin sequence;
supplying a second input torque to the generator that is employed to cause the generator to begin the second spin sequence; and
supplying a third input torque to the generator that is employed to cause the generator to begin the third spin sequence,
where the first input torque is about equal to the second input torque and
where the first input torque is about equal to the third input torque.

17. The method of claim 16,
where the wearable system is a footwear system,
where the first input torque is suppled from a spring hardware transfer component moved by a spring in response to a first heel strike,
where the second input torque is suppled from the spring hardware transfer component moved by the spring in response to a second heel strike,
where the third input torque is suppled from the spring hardware transfer component moved by the spring in response to a third heel strike,
where the first heel strike is separate and distinct from the second heel strike,
where the first heel strike is separate and distinct from the third heel strike,
where the second heel strike is separate and distinct from the third heel strike,
where the second heel strike occurs after the first heel strike,
where the third heel strike occurs after the second heel strike,
where the wearable system comprises the spring, and
where the footwear system comprises the hardware transfer component.

18. The method of claim 17,
where the footwear system comprises a source hardware transfer component configured to transfer a first energy from a source to the spring such that the spring is loaded with potential energy,
where before the second heel strike the footwear system experiences a first heel lift after the first heel strike,
where during at least part of the first heel strike the spring is coupled to the source,
where during at least part of the first heel strike the spring is decoupled from the generator,
where during at least part of the first heel lift the spring is decoupled from the source,
where during at least part of the first heel lift the spring is coupled to the generator.

19. The method of claim 15,
where the first spin sequence produces a first energy,
where the second spin sequence produces a second energy,
where the third spin sequence produces a third energy,
where a personal electronic device battery of a wearer of the footwear system is charged with the first energy,
where the personal electronic device battery of the wearer of the footwear system is charged with the second energy, and
where the personal electronic device battery of the wearer of the footwear system is charged with the third energy.

20. The footwear system of claim 8,
where the spring is a linear spring.

* * * * *